(12) United States Patent
Uchida et al.

(10) Patent No.: US 8,957,308 B2
(45) Date of Patent: Feb. 17, 2015

(54) ELECTRICAL CONNECTION BOX

(75) Inventors: Kunihiro Uchida, Yokkaichi (JP);
Yoshihisa Shimada, Yokkaichi (JP)

(73) Assignee: Sumitomo Wiring Systems, Limiited, Mie (JP)

( * ) Notice: Subject to any disclaimer, the term of this patent is extended or adjusted under 35 U.S.C. 154(b) by 232 days.

(21) Appl. No.: 13/235,942

(22) Filed: Sep. 19, 2011

(65) Prior Publication Data

US 2012/0199373 A1   Aug. 9, 2012

(30) Foreign Application Priority Data

Feb. 8, 2011  (JP) .................................. 2011-024891

(51) Int. Cl.
| | | |
|---|---|---|
| H01J 5/00 | (2006.01) | |
| H01J 15/00 | (2006.01) | |
| H02G 3/08 | (2006.01) | |
| H05K 5/00 | (2006.01) | |
| B60R 16/023 | (2006.01) | |

(52) U.S. Cl.
CPC .................................. B60R 16/0238 (2013.01)
USPC ............................................ 174/50; 361/752

(58) Field of Classification Search
None
See application file for complete search history.

(56) References Cited

U.S. PATENT DOCUMENTS

| | | | | |
|---|---|---|---|---|
| 4,934,580 | A * | 6/1990 | Sutton ........................... | 228/157 |
| 4,999,745 | A * | 3/1991 | Shimatani ..................... | 361/829 |
| 5,618,633 | A * | 4/1997 | Swanson et al. .............. | 428/593 |
| 5,655,927 | A * | 8/1997 | Maue et al. ................... | 439/510 |
| 7,038,124 | B1 * | 5/2006 | Sosnowski .................... | 174/383 |
| 7,561,430 | B2 * | 7/2009 | Tiedemann et al. .......... | 361/719 |
| 7,687,715 | B2 | 3/2010 | Sano | |
| 2007/0074755 | A1 * | 4/2007 | Eberspacher et al. ........ | 136/244 |
| 2007/0259263 | A1 * | 11/2007 | Shibuya et al. ............... | 429/186 |
| 2008/0266810 | A1 * | 10/2008 | Tiedemann et al. .......... | 361/719 |
| 2009/0023313 | A1 * | 1/2009 | Hayakawa ................... | 439/76.2 |

FOREIGN PATENT DOCUMENTS

JP    A-2009-026464    2/2009

* cited by examiner

*Primary Examiner* — Hoa C Nguyen
*Assistant Examiner* — Xanthia C Cunningham
(74) *Attorney, Agent, or Firm* — Oliff PLC

(57) ABSTRACT

An electrical connection box includes an insulating plate made of resin that supports an input load applied on a connection terminal to be connected to an electrical part. The insulating plate is contained between upper and lower cases and provided with a honeycomb structure portion penetrating through the insulating plate in a plate thickness direction. It thus becomes possible to provide an electrical connection box of a novel structure provided with an insulating plate not only ensuring strength with a smaller amount of resin but also capable of enhancing heat dissipation.

7 Claims, 7 Drawing Sheets

ELECTRICAL CONNECTION BOX

CROSS REFERENCE TO RELATED APPLICATIONS

This application claims priority to JP 2011-024891, filed in Japan on Feb. 8, 2011, the entire disclosure of which is hereby incorporated by reference in its entirety.

BACKGROUND

Exemplary embodiments of the present invention relate to an electrical connection box incorporated into an automobile or the like, and more particularly, to an electrical connection box provided with an insulating plate supporting a load applied on a connection terminal.

An electrical connection box, such as a junction box, has been employed in an automobile or the like to efficiently distribute a power supply from a battery to respective electrical components. As is described, for example, in JP-A-2009-26464, such an electrical connection box has an internal circuit formed of a printed-circuit board and a bus bar and the printed-circuit board and the bus bar are provided with connection terminals protruding to the outside of a case and thereby making themselves connectable to electrical parts, such as a connector and a fuse.

In general, the connection terminals are susceptible to a physical load, such as a press force and a pull-out force, at the time of attachment and detachment of electrical parts. Accordingly, the connection terminals may undergo deformation or the printed-circuit board may undergo deflection, thereby giving rise to solder cracking or damage to printed wiring. To eliminate these inconveniences, as is described in the reference document cited above, an input load to the connection terminals may be supported by supporting the printed-circuit board and the bus bar on an insulting plate. The insulating plate can be made of synthetic resin and of an integral structure with a stiffening rib to ensure strength, for example.

The insulating plate of this structure, however, can require a large amount of a resin material to form the rib. Using such an insulating plate can therefore raise a problem that not only increases the manufacturing costs but also a weight of the electrical connection box. Also, because the insulating plate is superimposed on the printed-circuit board entirely, heat dissipation may become poor due to deterioration of air convection.

SUMMARY OF THE INVENTION

Exemplary embodiments are devised in view of the foregoing and have an object to provide an electrical connection box of a novel structure provided with an insulating plate not only ensuring strength with a smaller amount of resin but also being capable of enhancing heat dissipation.

An electrical connection box according to a first exemplary embodiment can include a connection terminal to be connected to an electrical part and protruding to an outside of a case and an insulating plate made of resin supporting an input load applied on the connection terminal and contained in the case. The insulating plate can be provided with a honeycomb structure portion penetrating through the insulating plate in a plate thickness direction.

By forming the insulating plate in a penetrating configuration in the honeycomb structure portion, an amount of resin used to form the insulating plate can be reduced. Moreover, despite a reduction in amount of resin, strength can be ensured by adopting the honeycomb structure. It thus becomes possible to reduce the manufacturing costs and a weight of the electrical connection box. Further, because the insulating plate is formed in a penetrating configuration in the honeycomb structure portion, air convection within the electrical connection box is promoted. Heat can be therefore efficiently released from the printed-circuit board on which the insulating plate is superimposed. In other words, the insulating plate itself can have a honeycomb structure in contrast to the related art in which the insulating plate can be provided with a stiffening rib or a configuration thereof. Hence, not only does it become possible to form an insulating plate using a small amount of resin while ensuring strength, but it also becomes possible to enhance heat dissipation.

The honeycomb structure portion in the insulating plate may be provided to the insulating plate either entirely or in part. The connection terminal is not limited to those soldered to the printed-circuit board and those provided to a bus bar are also available. Accordingly, the insulating plate is not limited to the one that supports the printed-circuit board and can instead be the one that supports a bus bar. Further, the insulating plate may support the connection terminal against a physical load of either a press force applied on the connection terminal when an electrical part is attached thereto or a pull-out force applied on the connection terminal when an electrical part is detached therefrom.

According to a second exemplary embodiment, the electrical connection box according to the first exemplary embodiment above can be configured in such a manner that the insulating plate is provided with a thick portion and a thin portion and that the honeycomb structure portion is provided in the thick portion. For example, the honeycomb structure portion can be provided in substantially the entire thick portion of the insulating plate.

By providing the insulating plate with the thin portion having a small plate thickness dimension, it becomes possible, for example, to form an electrical part attachment portion, such as a connector attachment portion, provided to the case of the electrical connection box in closer proximity to the insulating plate by a distance corresponding to a thickness dimension that is reduced by providing the thin portion. Hence, when arranged in this manner, the electrical part attachment portion protrudes less toward the outside of the case than otherwise, which can in turn make the electrical connection box more compact. By forming the thick portion having a large plate thickness dimension in a penetrating configuration by providing the honeycomb structure portion, it becomes possible to form the thick portion with a small amount of resin while ensuring strength.

According to a third exemplary embodiment, the electrical connection box according to the first or second exemplary embodiment above can be configured in such a manner that the connection terminal is provided to a printed-circuit board in a protruding condition and that the printed-circuit board is superimposed on the insulating plate.

By supporting the printed-circuit board on the insulating plate, the connection terminal provided to the printed-circuit board can be supported, too. It thus becomes possible to reduce the possibility of solder cracking or damage to printed wiring by suppressing deformation of the printed-circuit board. Also, because the insulating plate is formed in a penetrating configuration in the honeycomb structure portion, even when the printed-circuit board is superimposed thereon, heat can efficiently be released from the printed-circuit board.

According to a fourth exemplary embodiment, the electrical connection box according to the third exemplary embodiment above can be configured in such a manner that the printed-circuit board includes first and second printed-circuit boards that are respectively superimposed on opposite faces of the insulating plate such that the honeycomb structure portion is situated between the two printed-circuit boards.

When configured in this manner, two printed-circuit boards can be supported on the single insulating plate. Also, because the honeycomb structure portion is situated between the two printed-circuit boards, the insulating plate is capable of supporting the two printed-circuit boards with excellent strength. Further, because the insulating plate situated between the both printed-circuit boards is formed in a penetrating configuration, heat can efficiently be released from each of the printed-circuit boards.

According to a fifth exemplary embodiment, the insulating plate supporting an input load applied on the connection terminal can be provided with the honeycomb structure portion that penetrates through the insulating plate in the plate thickness direction. The honeycomb structure portion can, for example, comprise a plurality of aligned regular hexagonal through-holes penetrating through the thick portion in the plate thickness direction. It thus becomes possible to form the insulating plate by reducing an amount of resin while ensuring strength. Further, because the insulating plate is formed in a penetrating configuration in the honeycomb structure portion, air convection within the electrical connection box is promoted, which can in turn enhance a heat dissipation effect.

DESCRIPTION OF THE PREFERRED EMBODIMENT

Hereinafter, exemplary embodiments will be described with reference to the drawings.

Figure 1:
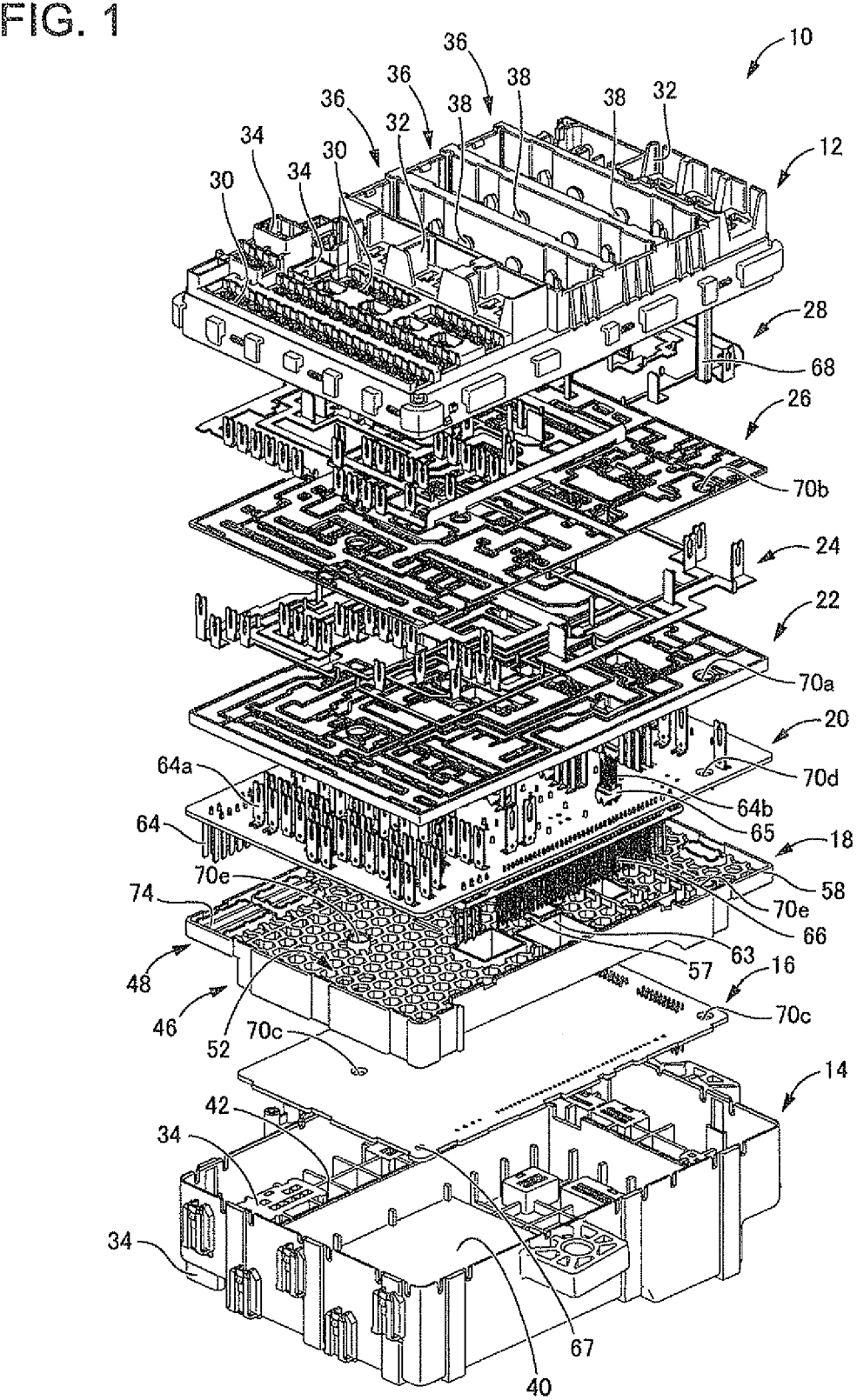
FIG. 1 is an exploded perspective view of an electrical connection box according to an exemplary embodiment.

Firstly, FIG. 1 shows an electrical connection box 10 according to an exemplary embodiment. The electrical connection box 10 is of a structure containing, between an upper case 12 and a lower case 14, a first printed-circuit board 16, an insulating plate 18, a second printed-circuit board 20, a first bus bar insulating plate 22, a first bus bar 24, a second bus bar insulating plate 26, and a second bus bar 28 sequentially laminated in this order from the side of the lower case 14.

Figure 2:
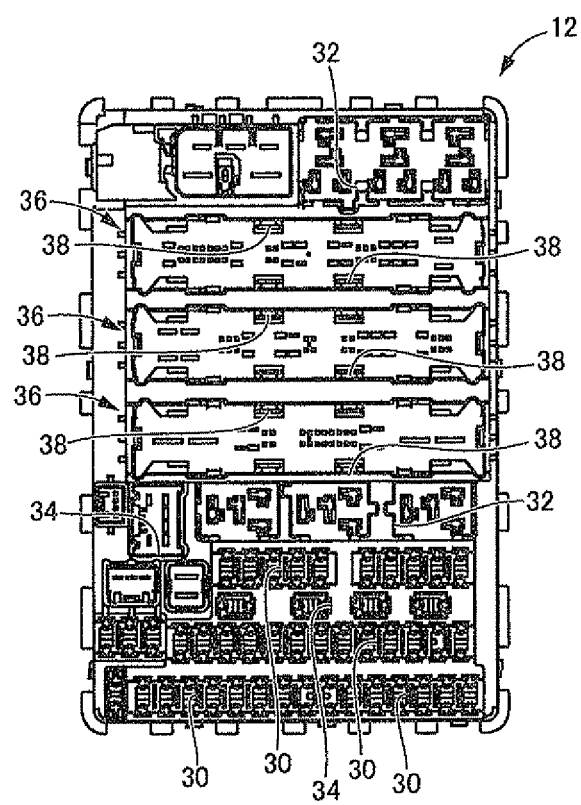
FIG. 2 is a top view of an upper case of FIG. 1.

FIG. 2 shows upper case 12. As electrical part attachment portions, as many known fuse attachment portions 30, relay attachment portions 32, and connector attachment portions 34 as required are provided to the case 12 at appropriate positions. In particular, the upper case 12 of this embodiment is provided with three lever connector attachment portions 36 in parallel. To these lever connector attachment portions 36 are attached unillustrated lever connectors as electrical parts.

The lever connector attachment portions 36 each are a relatively large attachment portion substantially across a width of the upper case 12 (in the left-right direction of FIG. 2). As in the related art, a lever of the unillustrated lever connector is engaged with lever engagement portions 38 provided to an inner peripheral surface in a protruding condition and by an engaging and guiding action of the lever and the lever engagement portions 38, the lever connector is guided into the lever connector attachment portion 36 and attached thereto.

Figure 3:
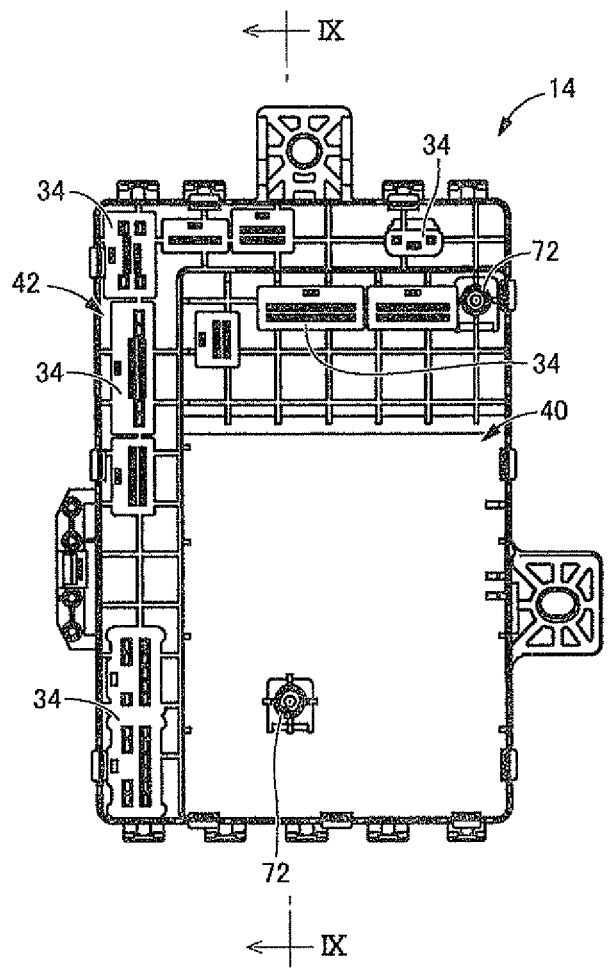
FIG. 3 is a top view of a lower case of FIG. 1.
Figure 4:
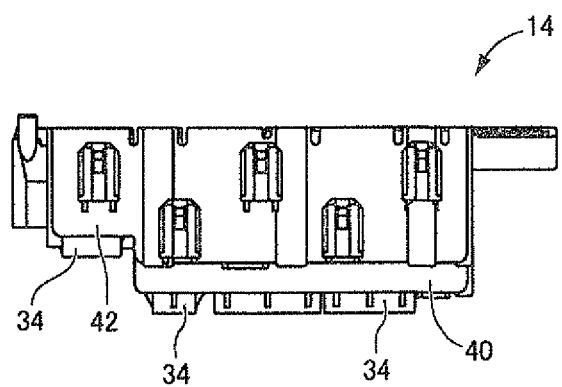
FIG. 4 is a side view of the lower case.

FIG. 3 and FIG. 4 show lower case 14. FIG. 3 is a top view showing an inner surface of the lower case 14. As electrical part attachment portions, as many known connector attachment portions 34 as required are provided to the case 14 at appropriate positions. As shown by FIG. 4, a depth dimension of the lower case 14 varies in part to form a first bottom portion 40 of substantially an oblong shape and having a depth dimension made relatively large and a second bottom portion 42 of an L shape conforming to an outer peripheral portion along two sides of the first bottom portion 40 and having a depth dimension made smaller than that of the first bottom portion 40. Owing to this arrangement, the connector attachment portions 34 provided to the second bottom portion 42 protrude less toward the outside of the lower case 14 (toward the lower side of FIG. 4) than the connector attachment portions 34 provided to the first bottom portion 40.

Figure 5:
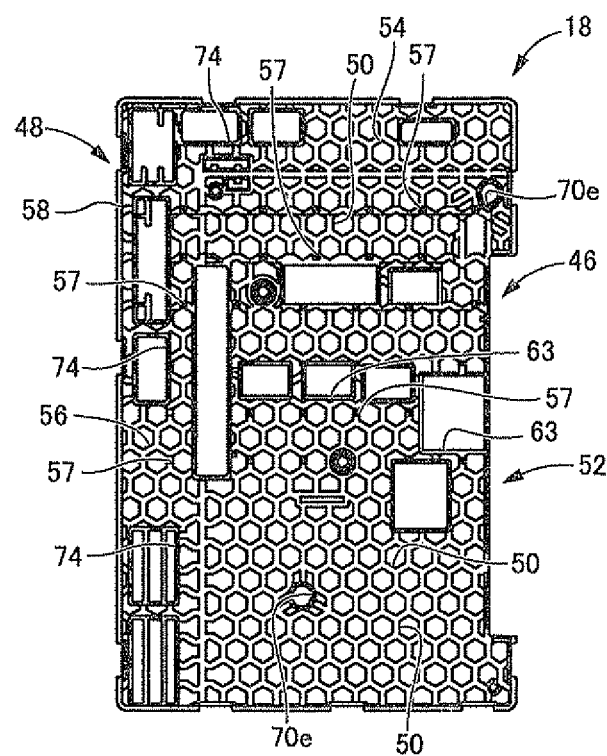
FIG. 5 is a top view of an insulating plate of FIG. 1.
Figure 6:
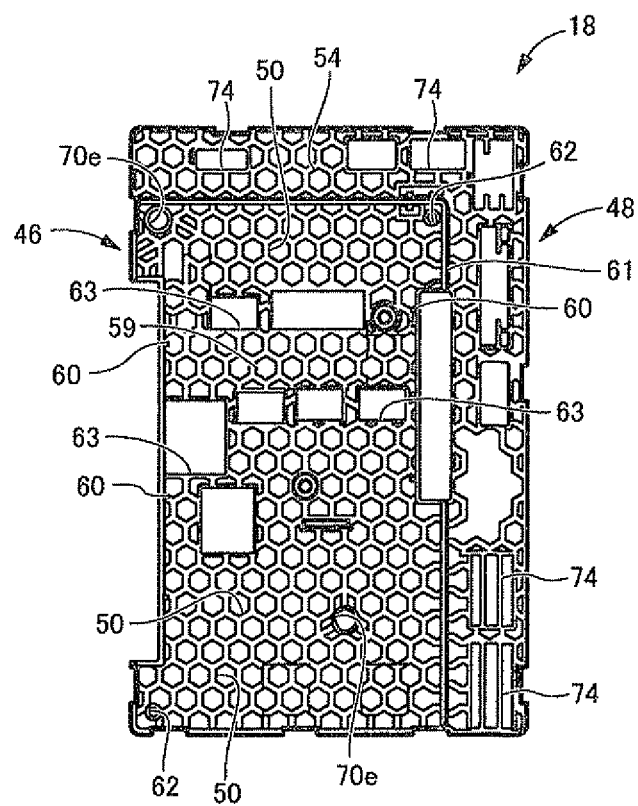
FIG. 6 is a bottom view of the insulating plate.
Figure 7:
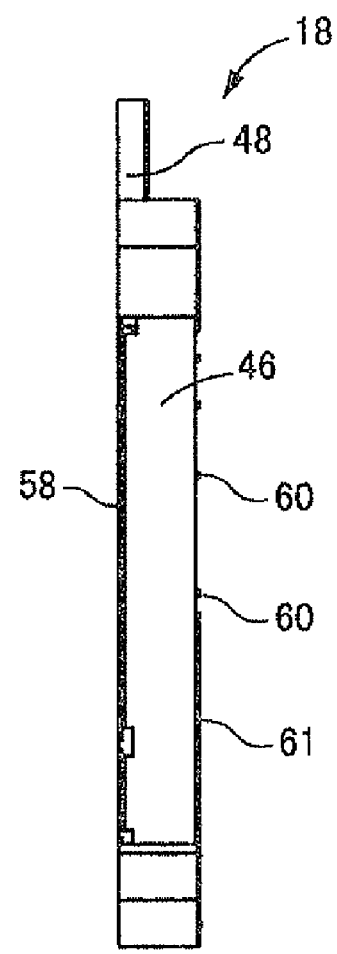
FIG. 7 is a side view of the insulating plate.
Figure 8:
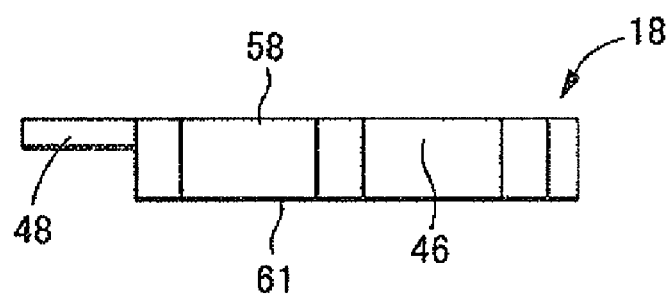
FIG. 8 is a side view of the insulating plate different from the side view of FIG. 7.

FIG. 5 through FIG. 8 show insulating plate 18. The insulating plate 18 is an integrally molded article made of non-conductive synthetic resin. The insulating plate 18 is of substantially an oblong plate shape as a whole. As shown by FIG. 7 and FIG. 8, a thickness dimension (a dimension in the top-bottom direction of FIG. 8) of the insulating plate 18 varies in part to form a thick portion 46 made relatively thick and a thin portion 48 having a smaller thickness dimension than the thick portion 46. The thick portion 46 corresponds to the first bottom portion 40 of the lower case 14 and it is formed in an oblong shape of substantially the same size as the first bottom portion 40 whereas the thin portion 48 corresponds to the second bottom portion 42 and it is formed in an L shape conforming to the outer peripheral portion along two sides of the thick portion 46 and of substantially the same size as the second bottom portion 42. Edges of the thick portion 46 and the thin portion 48 on the side of the upper case 12 (on the upper side of FIG. 8) are formed on the same plane whereas the thick portion 46 protrudes more than the thin portion 48 toward the lower case 14 (toward the lower side of FIG. 8).

The thick portion 46 has a honeycomb structure penetrating therethrough in a plate thickness direction (the left-right direction of FIG. 7) and is provided with a large number of aligned regular hexagonal through-holes 50 penetrating through the thick portion 46 in the plate thickness direction. Accordingly, in this embodiment, a honeycomb structure portion 52 is provided to substantially the entire thick portion 46. Meanwhile, the thin portion 48 is formed in a solid plate configuration and provided with a stiffening rib 54 of a honeycomb shape substantially entirely.

As shown in FIG. 5, a top surface 56 of the insulating plate 18 on the side of the upper case 12 can be provided with a plurality of upper supporting protrusions 57 in a protruding condition at appropriate positions. Protrusion tip ends of the upper supporting protrusions 57 and a protrusion tip end of an upper circumference rib 58 provided to the insulating plate 18 along the outer circumference in a protruding condition are set at levels equal to each other. Meanwhile, as shown in FIG. 6, a bottom surface 59 on the side of the lower case 14 in the thick portion 46 can be provided with a plurality of lower supporting protrusions 60 in a protruding condition along the outer circumference. Protrusion tip ends of the lower supporting protrusions 60 and a protrusion tip end of a lower circumference rib 61 provided to the thick portion 46 in a protruding condition along the outer circumference can be set at levels equal to each other. Also, as shown in FIG. 6, the insulating plate 18 can be provided with two screw holes 62 made at two diagonally opposing corners of the thick portion 46. Further, the thick portion 46 can be provided with a plurality of rectangular part containing holes 63 penetrating therethrough in a plate thickness direction (the left-right direction of FIG. 7).

Also, as shown in FIG. 1, the first and second printed-circuit boards 16 and 18 can each have a structure same as that of an existing printed-circuit board. The first and second printed-circuit boards 16 and 20 can each be provided with fork-shaped connection terminals 64a to be connected to unillustrated fuses and relays as electrical parts and connection terminals 64b each combined with a resin seat 65 and to be connected to unillustrated connectors as electrical parts. These connection terminals 64a and 64b can be soldered to the respective first and second printed-circuit boards 16 and 20 at appropriate positions in a protruding condition. Hereinafter, a description will be given without discriminating between the connection terminals 64a and 64b. Also, in this example, the first printed-circuit board 16 is of substantially the same size as the thick portion 46 of the insulating plate 18 whereas the second printed-circuit board 20 is of the same size across substantially the entire insulating plate 18. The first printed-circuit board 16 and the second printed-circuit board 20 are provided, respectively, with both ends of a plurality of board-to-board terminals 66 by soldering. The first and second printed-circuit boards 16 and 20 are therefore connected to each other in this example with a plurality of the board-to-board terminals 66.

Figure 9:
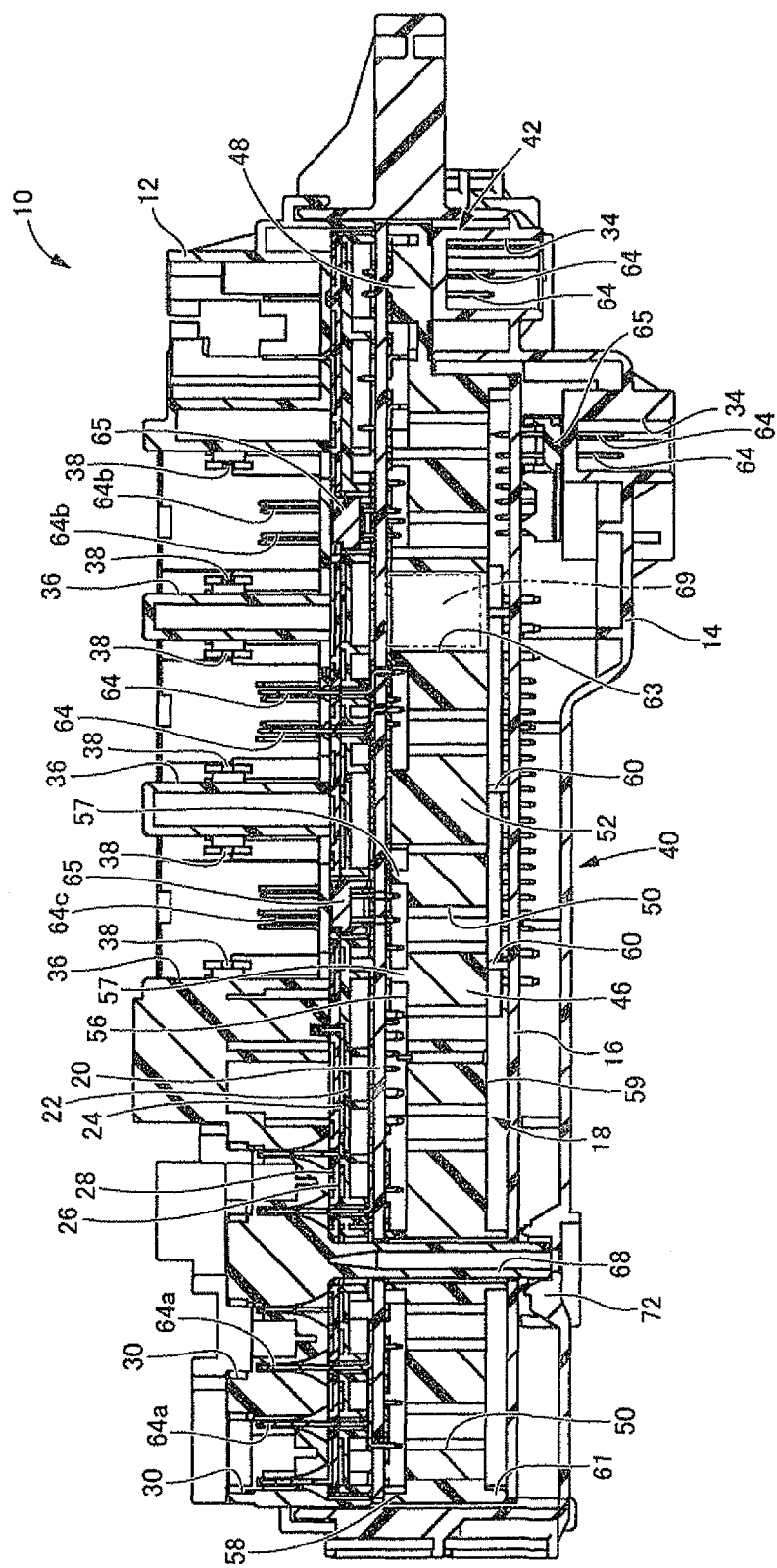
FIG. 9 is a cross section of the electrical connection box taken on line IX-IX of FIG. 3.

As shown in FIG. 9, the first printed-circuit board 16 and the second printed-circuit board 20 can be disposed one on top of the other with the insulating plate 18 in between in such a manner that the first printed-circuit board 16 is superimposed on the bottom surface 59 of the insulating plate 18 and the second printed-circuit board 20 can be superimposed on the top surface 56 of the insulating plate 18. The first printed-circuit board 16 can be supported on the lower supporting protrusions 60 and the lower circumference rib 61 provided to the bottom surface 59 in the thick portion 46 and therefore superimposed on the bottom surface 59 in the thick portion 46 with a clearance. Likewise, the second printed-circuit board 20 can be supported on the upper supporting protrusions 57 and the upper circumference rib 58 provided to the top surface 56 of the insulating plate 18 and therefore superimposed on the top surface 56 of the insulating plate 18 substantially entirely with a clearance. The first printed-circuit board 16 can be provided with screw insertion holes 67 (see FIG. 1) at positions corresponding to the screw holes 62 in the insulating plate 18. The first printed-circuit board 16 can be screwed to the insulating plate 18 as unillustrated screws are threaded into the screw holes 62 in the insulating plate 18 through the screw insertion holes 67. In this manner, the honeycomb structure portion 52 provided to the thick portion 46 of the insulating plate 18 can be situated between the first printed-circuit board 16 and the second printed-circuit board 20. To the bottom surface of the second printed-circuit board 20 opposing the insulating plate 18 can be attached electrical parts, such as relays 69, and these electrical parts can be contained in the part containing holes 63 in the insulating plate 18.

Further, the first bus bar insulating plate 22, the first bus bar 24, the second bus bar insulating plate 26, and the second bus bar 28 can be laminated sequentially in this order on the second printed-circuit board 20 and contained between the lower case 14 and the upper case 12. The upper case 12 can be provided with insertion rods 68 protruding toward the lower case 14. The upper case 12 can be screwed to the lower case 14 as the insertion rods 68 are inserted into rod insertion holes 70a through 70e (see FIG. 1) provided to penetrate through the first and second bus bar insulating plates 22 and 26, the first and second printed-circuit boards 16 and 20, and the insulating plate 18, respectively, until each abuts on a corresponding screwed portion 72 provided to the lower case 14 while unillustrated screws are inserted into the screwed portions 72 from the outside of the lower case 14. Consequently, the insulating plate 18 and the first and second printed-circuit boards 16 and 20 can be positioned within the upper case 12 and the lower case 14.

In a state of being contained between the upper case 12 and the lower case 14, the thick portion 46 of the insulating plate 18 can be situated to superimpose on the first bottom portion 40 of the lower case 14 while the thin portion 48 is situated to superimpose on the second bottom portion 42. The connection terminals 64 of the first printed-circuit board 16 provided on the side of the lower case 14 in a protruding condition can pass through the lower case 14 to be disposed in the connector attachment portions 34 of the lower case 14 by protruding to the outside of the lower case 14. Meanwhile, the connection terminals 64 of the second printed-circuit board 20 provided on the side of the upper case 12 in a protruding condition can pass through the upper case 12 to be disposed in the fuse attachment portions 30, the relay attachment portions 32, the connector attachment portions 34, and the lever connector attachment portions 36 of the upper case 12 by protruding to the outside of the upper case 12. Further, the second printed-circuit board 20 can be provided with the connection terminals 64 in a protruding condition on the side of the lower case 14, too. The connection terminals 64 provided in a protruding condition on the side of the lower case 14 can pass through terminal insertion holes 74 provided to penetrate through the thin portion 48 of the insulating plate 18 and further pass through the lower case 14 to be disposed in the connector attachment portions 34 provided to the second bottom portion 42 of the lower case 14 by protruding to the outside of the lower case 14.

According to the electrical connection box 10 having the structure of this embodiment, in a case where unillustrated fuses, relays, and connectors as electrical parts are attached to the fuse attachment portions 30, the relay attachment portions 32, the connector attachment portions 34, and the lever connector attachment portions 36 of the upper case 12, a load in a pressing direction (from top to bottom of FIG. 9) can be applied on the connection terminals 64 provided to the second printed-circuit board 20 in a protruding condition. The connection terminals 64 can be supported as the second printed-circuit board 20 is supported on the insulating plate 18. Likewise, in a case where unillustrated connectors are attached to the connector attachment portions 34 of the lower case 14, a load in a pressing direction (from bottom to top of FIG. 9) can be applied on the connection terminals 64 provided to the first printed-circuit board 16 in a protruding condition. The connection terminals 64 can be supported as the first printed-circuit board 16 is supported on the insulting plate 18.

In this embodiment, the honeycomb structure portion 52 can be provided to the thick portion 46 of the insulating plate 18. Owing to this arrangement, strength of the thick portion 46 can be ensured. It thus becomes possible to lessen deformation of the first and second printed-circuit boards 16 and 20 and reduce the occurrence of cracking in soldered portions of the connection terminals 64 by firmly supporting the connection terminals 64 provided to the first and second printed-circuit boards 16 and 20 in a protruding condition. Consequently, like the connection terminals 64 disposed in the lever connector attachment portions 36, even the connection terminals 64 to be connected to large lever connectors and susceptible to a large load become able to ensure a supporting force with a small amount of resin. Further, because the insulating plate 18 is in a penetrating configuration in the honeycomb structure portion 52, air convection within the electrical connection box 10 is promoted. It thus becomes possible to efficiently release heat from the first and second printed-circuit boards 16 and 20. Hence, by providing the honeycomb structure portion 52 in a penetrating configuration, not only can strength of the thick portion 46 be ensured while reducing an amount of resin, but also heat dissipation can be enhanced. In this embodiment, in particular, because the first and second printed-circuit boards 16 and 20 are superimposed, respectively, on the bottom surface 59 and the top surface 56 of the insulating plate 18 with clearances owing to the lower supporting protrusions 60 and the upper supporting protrusion 57, respectively, an excellent heat dissipation effect can be obtained. In addition, because the insulating plate 18 in this embodiment is in a penetrating configuration in the honeycomb structure portion 52, it becomes possible to visually confirm the first printed-circuit board 16 and the second printed-circuit board 20 through the through-holes 50. Hence, when the insulating plate 18 and the first and second printed-circuit boards 16 and 20 are positioned, workability can be enhanced.

In this embodiment, in particular, by interposing the insulating plate 18 between the first printed-circuit board 16 and the second printed-circuit board 20, it becomes possible to support any of the connection terminals 64 provided to the both printed-circuit boards 16 and 20 on the single insulating plate 18. In addition, because the honeycomb structure portion 52 in a penetrating configuration in this embodiment is situated between the both printed-circuit boards 16 and 20, heat can efficiently be released from the both printed-circuit boards 16 and 20. Further, because strength of the insulating plate 18 between the both printed-circuit boards 16 and 20 and heat dissipation can be enhanced by the honeycomb structure portion 52, thermal deformation of the insulating plate 18 can be suppressed. It thus becomes possible to suppress the occurrence of cracking in soldered portions of the board-to-board terminals 66 caused by relative positional displacement between the both printed-circuit boards 16 and 20 arising from thermal deformation of the insulating plate 18.

The insulating plate 18 can be provided with the thin portion 48. Owing to this arrangement, the connection terminals 64 protruding from the second printed-circuit board 20 toward the lower case 14 can come out from the lower case 14 without having to increase a length dimension. Meanwhile, because the connection terminals 64 provided to the second printed-circuit board 20 are disposed in the connector attachment portions 34 provided to the second bottom portion 42 of the lower case 14, when arranged as described above, these connector attachment portions 34 protrude less toward the outside of the lower case 14 than otherwise. The electrical connection box 10 can be therefore made more compact. Further, because the thin portion 48 in this embodiment is in a solid configuration and provided with the honeycomb-shaped stiffening rib 54, strength thereof is ensured. Also, by providing the thick portion 46 with the part containing hole 63 to contain therein large parts, such as the relays 69 provided to the second printed-circuit board 20, it becomes possible to dispose large electrical parts, such as the relays 69, within the electrical connection box 10 at high space efficiency by utilizing a thickness dimension of the thick portion 46.

Figure 10A:
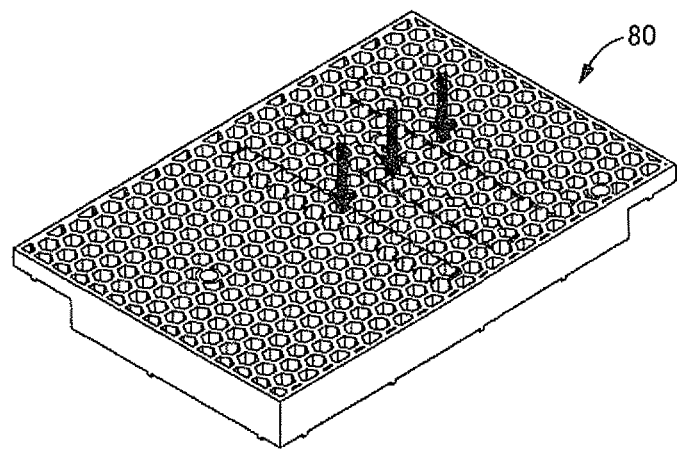
FIG. 10A is a view used to describe an insulating plate having a structure of an exemplary embodiment.
Figure 10B:
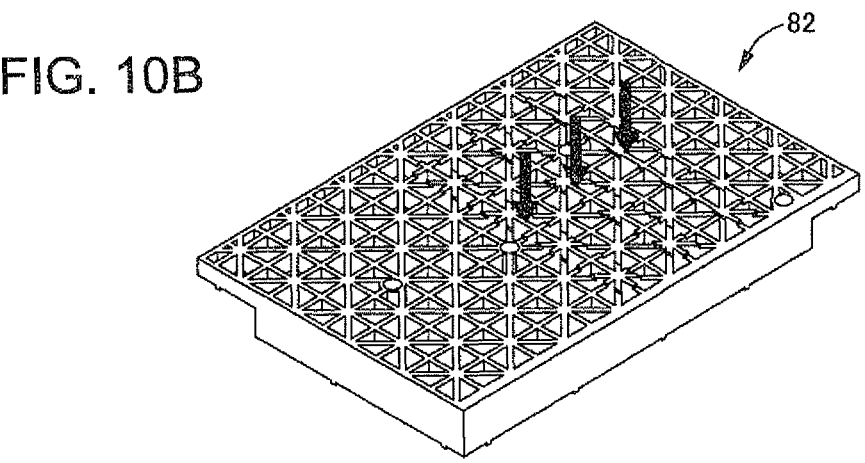
FIG. 10B is a view used to describe an insulating plate having a structure in the related art.

FIG. 10A shows an insulating plate 80 having the structure of an exemplary embodiment and FIG. 10B shows an insulating plate 82 having a structure in the related art as a comparative example. The insulating plate 80 and the insulating plate 82 are, as a whole, of substantially the same shape as the insulating plate 18 of the embodiment described above. The insulating plate 80 in this embodiment has a honeycomb structure portion in a penetrating configuration of an exemplary embodiment. As a comparison, the insulating plate 82 having the structure in the related art does not have a honeycomb structure portion and in a non-penetrating configuration. The insulating plate 82 is provided with a stiffening rib and formed of a combination of a lattice configuration and a diagonally extending configuration. For each of the insulating plates 80 and 82, a numerical analysis was conducted on an amount of deflection caused by a load applied when connectors are attached to each at three points indicated by arrows. Then, a maximum amount of deflection of the insulating plate 80 having the structure of an exemplary embodiment was found to be 35% of a maximum amount of deflection of the insulating plate 82 having the structure in the related art. From this analysis result, it is apparent that an exemplary embodiment can ensure higher strength than the structure in the related art while achieving a reduction in amount of resin and weight by forming the insulating plate in a penetrating configuration.

While a number of exemplary embodiments have been described, it should be appreciated that the invention is not limited to the specific descriptions above. For example, the connection terminals supported on the insulating plate are not limited to the connection terminals provided to the printed-circuit boards and the connection terminals provided to the bus bars may be supported on the insulating plate instead. Accordingly, the insulating plate is not limited to the one that supports the printed-circuit boards and the insulating plate may support the bus bar instead. Further, the insulating plate may support an input load applied on the connection terminals in a pull-out direction.

In addition, the electrical connection box 10 of the embodiment above may be configured to contain two printed-circuit boards: the first printed-circuit board 16 and the second printed-circuit board 20. The electrical connection box 10, however, may be configured to contain only one or three or more printed-circuit boards. Further, in a case where the connection terminals provided to the bus bars are supported on the insulating plate, it may be configured in such a manner that the electrical connection box does not contain the printed-circuit boards but contains the bus bar(s) alone.

What is claimed is:
1. An electrical connection box, comprising:
   a connection terminal to be connected to an electrical part and protruding to an outside of a case; and
   an insulating plate made of resin supporting an input load applied on the connection terminal and contained in the case, wherein:
   the insulating plate is provided with a honeycomb structure penetrating through the insulating plate in a plate thickness direction,
   the insulating plate has a first surface and a second surface that opposes the first surface, and
   the honeycomb structure includes a plurality of aligned regular hexagonal through-holes penetrating through the thick portion in the plate thickness direction, the plurality of aligned regular hexagonal through-holes forming the honeycomb structure wherein the insulating plate includes a thick portion and a thin portion; and the honeycomb structure is provided in the thick portion.

2. The electrical connection box according to claim 1, wherein:
   the connection terminal is provided to a first printed-circuit board in a protruding condition; and
   the first printed-circuit board is superimposed on a first face of the insulating plate.

3. The electrical connection box according to claim 2, further comprising:
   a second printed-circuit board superimposed on a second face of the insulating plate opposite the first face, such that
   the honeycomb structure is situated between the first and second printed-circuit boards.

4. The electrical connection box according to claim 3, wherein the first printed-circuit board is substantially the same size as the thick portion of the honeycomb structure.

5. The electrical connection box according to claim 3, wherein the second printed-circuit board is substantially the same size as an entire portion of the insulating plate.

6. The electrical connection box according to claim 1, wherein the honeycomb structure is provided in substantially the entire thick portion.

7. The electrical connection box according to claim 1, wherein the thin portion forms an L-shape along two sides of an outer periphery of the thick portion.

* * * * *